US006404895B1

(12) United States Patent
Weidner

(10) Patent No.: US 6,404,895 B1
(45) Date of Patent: Jun. 11, 2002

(54) METHOD FOR FEEDBACK RECOGNITION IN A HEARING AID AND A HEARING AID OPERATING ACCORDING TO THE METHOD

(75) Inventor: Tom Weidner, Nuremberg (DE)

(73) Assignee: Siemens Audiologische Technik GmbH, Erlangen (GB)

(*) Notice: Subject to any disclaimer, the term of this patent is extended or adjusted under 35 U.S.C. 154(b) by 0 days.

(21) Appl. No.: 09/484,590

(22) Filed: Jan. 18, 2000

(30) Foreign Application Priority Data

Feb. 4, 1999 (DE) ...................................... 199 04 538.0

(51) Int. Cl.[7] ................................................ H04L 25/00

(52) U.S. Cl. ......................... 381/318; 381/312; 381/83; 381/93

(58) Field of Search ................................ 381/23.1, 312, 381/318, 320, 321, FOR 127, FOR 129, FOR 131, 83, 93, 94.3, 95, 96, 59

(56) References Cited

U.S. PATENT DOCUMENTS 5,259,033 A * 11/1993 Goodings et al. ........... 381/318
5,717,772 A * 2/1998 Lane et al. ................... 381/83

FOREIGN PATENT DOCUMENTS

EP 0 415 677 3/1991

* cited by examiner

*Primary Examiner*—Huyen Le
(74) *Attorney, Agent, or Firm*—Schiff Hardin & Waite

(57) ABSTRACT

In a method for feedback recognition in a hearing aid and a hearing aid operating according to the method, a frequency band is defined, a first signal level in the frequency band is determined, the signal on a signal transmission path of the hearing aid is attenuated, and a second signal level of the attenuated signal in the frequency band is determined, and feedback is recognized on the basis of the identified first and second signal levels.

12 Claims, 1 Drawing Sheet

METHOD FOR FEEDBACK RECOGNITION IN A HEARING AID AND A HEARING AID OPERATING ACCORDING TO THE METHOD

BACKGROUND OF THE INVENTION

1. Field of the Invention

The present invention is directed to a method for feedback recognition in a hearing aid and is also directed to a hearing aid with feedback recognition. The invention can be utilized for all hearing aid embodiments and technologies, for example for behind-the-ear or for in-the-ear hearing aids that can be constructed in analog or digital circuitry or in mixed forms.

2. Description Of The Prior Art

There is the general problem in hearing aids of an undesired acoustic feedback between the audio transducer and the microphone. Such a feedback can cause whistling noises or other disturbances and thus considerably diminishes the utility of the hearing aid for the hearing aid wearer or can even reduce it to zero. Dependent on the properties of the hearing aid and the auditory situation, feedback can occur at different frequencies.

Most hearing aids currently on the market exhibit no particular devices for feedback recognition and feedback suppression. Feedback in such devices can only be avoided by a correspondingly low gain setting (as a preventative measure or as needed by the user). This measure, however, also reduces the utility of the hearing aid for users who require high amplification.

European Application 0 415 677 discloses a hearing aid having a negative feedback path. A filter connected in the feedback path models the property of the acoustic transmission path from the audio transducer to the microphone in order to compensate acoustically fed back signal parts. The quality of the feedback suppression achieved in this way, however, is highly dependent on the properties of the filter. Moreover, the hearing aid disclosed in European Application 0 415 677 is technologically complicated.

SUMMARY OF THE INVENTION

An object of the present invention is to provide a method and a hearing aid which reliably recognize feedback occurring in the hearing aid, so that suitable measures for feedback suppression can be undertaken. A further object is to provide such a method and hearing aid wherein the feedback recognition occurs automatically and dependably in a broad frequency range and is inaudible for the hearing aid wearer.

The above object is inventively achieved in a method and a hearing aid wherein feedback is recognized by optionally attenuating a frequency band in which feedback could occur in the signal transmission path between the microphone and the audio transducer. A signal level of the signal transmitted on the signal transmission path is determined without or with the added attenuation. When feedback arises in the monitored frequency band, the signal level is reduced more greatly by the attenuation than would be expected without feedback. The fed back signal components multiply pass through the attenuation unit, so that the feedback is highly diminished or is completely eliminated. As a result, feedback can be dependably recognized and suitable countermeasures can be undertaken.

Preferably, the feedback recognition is implemented multiply or continuously in different frequency bands. The entire frequency range in which feedback can occur (for example, the entire transmission range of the hearing aid) thus can be constantly monitored. In alternative embodiments of the hearing aid, only a few frequency ranges are monitored; only a single one in the extreme case. This can be meaningful when only specific feedback frequencies are anticipated in specific hearing aid structures or when especially simple and low cost bandpass and/or band stop filters are utilized.

Since the attenuation is inventively connected into the ordinary signal transmission path of the hearing aid, it is desirable to optimally reduce the audible influence of the attenuation. In preferred embodiments, this occurs by attenuation in a relatively narrow frequency band and/or by attenuation which is only of a brief-duration attenuation and/or by a relatively slight degree of attenuation. As a result of one or more of these measures, feedback recognition that is imperceptible to the hearing aid user can be achieved.

The selection of a narrow attenuation frequency band (attenuation characteristic with high edge steepness) is especially meaningful when—as already mentioned—the feedback suppression is repeatedly implemented with different frequency bands. The width of the attenuated frequency band (distance between the corner frequencies) can, for example, amount to 100 Hz through 2 kHz.

In other embodiments, the duration of the attenuated operation amounts to only respectively 0.5 ms through 50 ms, preferably 5 ms. With, for example, a frequency from 10 Hz through 1 kHz, preferably 100 Hz, a switch can thus be undertaken between attenuated and non-attenuated operation. The time ratio between these two operating modes can amount to 1:1 or, for example, can provide a longer unattenuated operation. When a narrow frequency band is attenuated for only short time intervals, the degree of attenuation can be relatively high and, for example, amount to 10 dB. A high recognition dependability is thereby achieved and disturbance to the hearing aid user is nonetheless avoided.

In order to recognize a feedback situation, signal intensities are determined with and without attenuation. The signal intensities preferably are determined only in that frequency band that is also subject to the attenuation. As a result, an especially high recognition dependability and insensitivity to noise is achieved. In alternative embodiments of the hearing aid, however, signal intensities of broader frequency bands can be identified or, in the extreme case, those of the entire transmission spectrum.

Preferably the attenuation of the signal intensity due to the attenuation connected into the signal transmission path is used as a criterion for the feedback recognition. For example, it can be determined whether the signal attenuation exceeds a predetermined limit value. This limit value, for instance, can be two or three times as high as the attenuation which is anticipated given non-fed back hearing aid operation.

In preferred embodiments, the attenuation frequency band is variable in steps or continuously. For monitoring a broad frequency range, this can be steadily stepped or "critical" frequencies can be more frequently selected. In preferred developments, the frequency band for the monitoring is selected on the basis of a pre-examination of the signal transmitted by the hearing aid. Thus, for example, the attenuation frequency band can be set to frequencies of an especially loud signal part. Alternatively or additionally, an oscillation detector can be employed that reacts to (sine-shaped) feedback tones. Such an oscillation detector can, for example, determine the time intervals between zero-axis crossings in the hearing aid signal and can evaluate them for setting the attenuation frequency band.

In embodiments of the invention, feedback that has occurred is not only recognized but is also largely or completely suppressed. The attenuation of the hearing aid signal in accordance with the invention can already serve this purpose when it is strong enough in order to cause the feedback to subside. Alternatively or additionally, other devices can be provided for feedback suppression, for example an amplifier with variable gain and/or a further band stop filter and/or a phase shifter or which acts on the hearing aid signal.

DESCRIPTION OF THE PREFERRED EMBODIMENTS

Figure 1:
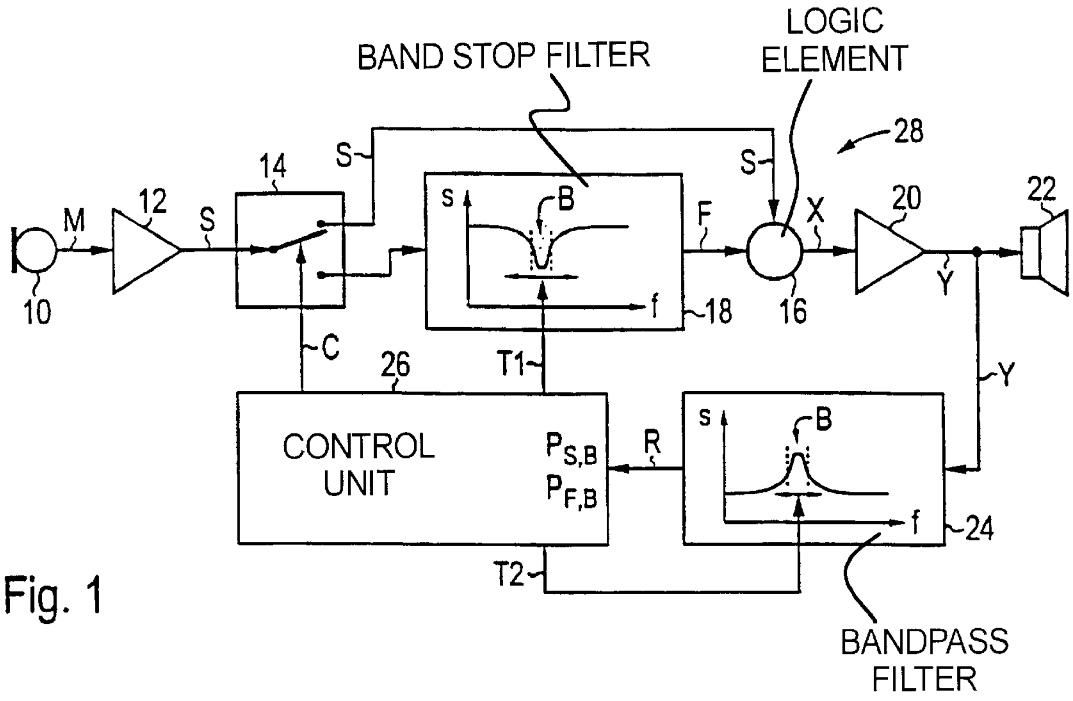
FIG. 1 is a block diagram of a hearing aid wherein an inventive method for feedback recognition is implemented.

In the hearing aid shown in FIG. 1, a microphone signal M is generated by a microphone 10. An amplifier 12 fashioned as a pre-amplifier processes the microphone signal M and generates a transmission signal S that is conducted to the input of an electrically controlled switch 14. In the switch state of the switch 14 shown in FIG. 1, the transmission signal S is directly supplied to a logic element 16, whereas the transmission signal S is conducted via a tunable band stop filter 18 in the opposite switch state of the switch 14. The output signal of the band stop filter 18 is present at the logic element 16 as filter signal F.

Dependent on the position of the switch 14,.the logic element 16 conducts one of the two signals S and F unmodified to an output stage 20 as an output signal X. The output stage 20 amplifies the output signal X in a known way and thus generates a signal Y that is converted by an audio transducer 22, for example a loudspeaker or an earphone, into an output audio signal.

The signal Y is also supplied to a tunable bandpass filter 24. The bandpass filter 24 generates a signal R that is supplied to a control unit 26. In alternative embodiments, instead of the signal Y the output signal X that is supplied to the bandpass filter 24. These alternative embodiments are equivalent to the exemplary embodiment shown in FIG. 1 when the output stage 20 has linear amplification properties. When, however, the output stage 20 operates in non-linear fashion (for example, has a gain dependent on input level), the circuit of FIG. 1 has the advantage that the output stage properties are also taken into consideration in the feedback recognition.

The control unit 26 generates a control signal C for the switch 14 and generates two tuning signals T1, T2. As a result of the first tuning signal T1, the frequency band B of the stop range of the band stop filter 18 is set, and the frequency band B of the pass band of the bandpass filter 24 is set by the second tuning signal T2. The frequency responses of the band stop filter 18 and of the bandpass filter 24 are schematically indicated in FIG. 1 and in FIG. 2 by a respective filter characteristic graphs having the frequency f and the signal transmissivity s as coordinate axes.

During operation of the hearing aid according to FIG. 1 the microphone 10, the amplifier 12, the output stage 20 and the audio transducer 22 form a signal transmission path 28 that is known. In the inventive hearing aid, however, the band stop filter 18 is optionally connected into this signal transmission path 28 in order to attenuate frequencies in the frequency band B. To that end, the control unit 26 in the exemplary embodiment switches the switch 14 with a frequency of 100 Hz back and forth between the unattenuated and the attenuated operating modes of the hearing aid.

In the exemplary embodiment described herein, the stop band of the band stop filter 18 and the passband of the bandpass filter 24 always exhibit an identical frequency band B. Accordingly, the tuning signals T1, T2 are also identical. The frequency band B is kept constant for the duration of a switching cycle of the switch 14 (i.e. for an attenuated operating phase and an unattenuated operating phase). Before the beginning of the next switch cycle, both filters 18, 24 are set to a new frequency band B in order to monitor this band for feedback. In the exemplary embodiment described here, the entire tuning range of the filters 18, 24 is thereby successively swept, whereby the width of the frequency band B shifted at every step.

For feedback recognition, the control unit 18 determines a first signal level $P_{S,B}$ of the transmission signal S in the frequency band B that is unattenuated and amplified by the output stage 20 in every switch cycle of the switch 14 and determines a second signal level $P_{F,B}$ of the filter signal F in the frequency band B attenuated by the band stop filter 18 and amplified by the output stage 20. As proceeds from FIG. 1 and from FIG. 2, the band stop filter 18 is then connected into the signal transmission path 18 exactly when the second signal level $P_{F,B}$ is identified. For determination of the signal level, the control unit 26 interprets the signal R of the band pass filter 24 tuned to the frequency band B.

When the two signal levels $P_{S,B}$ and $P_{F,B}$ have been identified, the control unit 18 calculates their difference $P_{S,B}$—$P_{F,B}$. This difference corresponds to the signal attenuation produced by the insertion of the band stop filter 18 into the signal transmission path 28. When no feedback is present, the difference $P_{S,B}-P_{F,B}$ is approximately to the normal attenuation W by the band stop filter 18. The normal attenuation W is known in advance, and is determined from the properties, particularly the filter characteristic, of the band stop filter 18. For example, W≈10 dB can apply.

In a feedback situation in the frequency band B, by contrast, a difference $P_{S,B}-P_{F,B}$ due to the interposition of the band stop filter 18 will occur that is clearly greater then the normal attenuation W of the band stop filter 18. The reason for this is that the fed back signal components repeatedly pass through the band stop filter 18 and, accordingly, are repeatedly attenuated. $P_{S,B}-P_{F,B}>W$ thus applies. In the aforementioned example of W≈10 dB, the difference $P_{S,B}-P_{F,B}$ arising upon occurrence of feedback can amount to approximately 15 dB or 20 dB. The control unit 26 then identifies the feedback situation by comparing the difference $P_{S,B}-P_{F,B}$ to a predetermined threshold that, for example, can amount to W+5 dB or 2×W. Given a signal attenuation by the insertion of the band stop filter 18 that exceeds the threshold, feedback is recognized; otherwise, it is not.

In the exemplary embodiment, the signal levels $P_{S,B}$ and $P_{F,B}$ are determined on a logarithmic scale, so that their difference $P_{S,B}-P_{F,B}$ represents a signal intensity relationship. The gain factor of the output stage 20 (assumed to be linear here) thereby plays no part. In alternative embodiments wherein the signal levels $P_{S,B}$ and $P_{F,B}$ are determined in some other way, the output stage gain must be taken into consideration when they are compared or when defining the threshold.

Suitable counter-measures can be undertaken on the basis of the feedback recognition shown in FIG. 1. One such counter-measure can be to inform a hearing aid acoustician of every feedback occurrence when fitting the hearing aid, so that he or she can suitably modify the hearing aid settings. In preferred exemplary embodiments of the invention, the hearing aid, however, contains a circuit for automatic feedback suppression that responds to the feedback recognition that was just described. Such a hearing aid is shown in FIG. 2.

Figure 2:
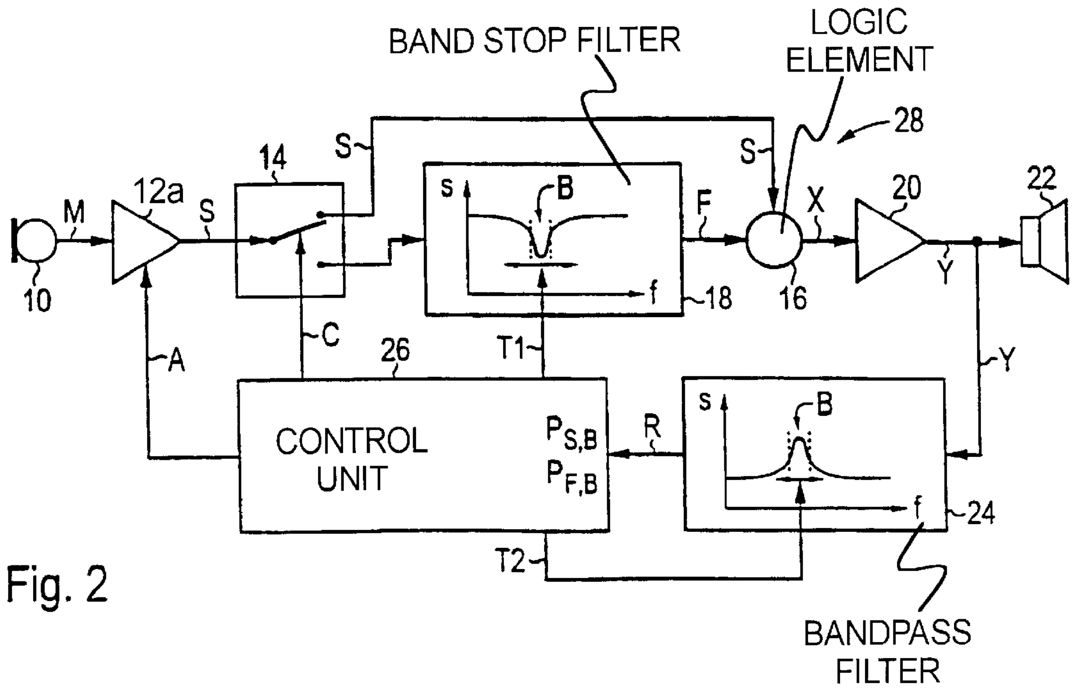
FIG. 2 is a block diagram of a further embodiment of an inventive hearing aid as in FIG. 1 with feedback suppression.

In the circuit of FIG. 2, the amplifier following the microphone 10 is fashioned as a controllable amplifier 12*a* whose gain factor is set by the control unit 26 with a gain setting signal A. Otherwise, the circuit corresponds to that of FIG. 1, and the functioning in view of the feedback recognition is also identical to that described above.

Given the hearing aid according to FIG. 2, the signal transmission path 28 is monitored for feedback after the hearing aid is switched on or after an initialization command made by the user or by the hearing aid acoustician. The control unit 26 increases the gain of the hearing aid gradually as long as no feedback occurs and a predetermined, maximum gain has not yet been reached. Such a gain setting can occur either in the entire transmission range of the hearing aid or—if the hearing aid circuit allows it—in individual frequency ranges. In the latter instance, thus, individual feedback-susceptible frequency bands can be designationally lowered. The automatic setting procedure of the hearing aid that takes place at every activation and/or when fitting the hearing aid is already extremely helpful and pleasant for the hearing aid wearer. In further embodiments, moreover, an ongoing feedback monitoring and feedback suppression ensue. Every time feedback is recognized, thus, the overall gain and/or the gain in the appertaining frequency band can be reduced. This reduction can be either permanent or can be gradual, so that the hearing aid constantly adapts to changing environmental conditions.

The block diagrams shown in FIG. 1 and in FIG. 2 represent possible circuits of hearing aids with analog structure. Corresponding functions can be provided for hearing aids in digital or partially digital technology. The components shown in FIG. 1 and in FIG. 2 (with the exception of the microphone 10 and of the audio transducer 22) can be partially or completely fashioned as modules of a control program of a digital signal processor (DSP). In particular, the functions of the control unit 26 can be implemented by a suitably programmed processor.

Although modifications and changes may be suggested by those skilled in the art, it is the intention of the inventor to embody within the patent warranted hereon all changes and modifications as reasonably and properly come within the scope of his contribution to the art.

I claim:

1. A Method for recognizing feedback in a hearing aid having a signal transmission path between a microphone and an audio transducer, comprising the steps of:

(a) determining a frequency band for feedback recognition;

(b) determining a first signal level of a signal in said frequency band transmitted on said signal transmission path;

(c) attenuating said signal in said frequency band transmitted on said signal path to obtain an attenuated signal in said frequency band, and determining a second signal level of said attenuated signal; and (d) recognizing feedback in said frequency band dependent on a relationship between said first signal level and said second signal level.

2. A method as claimed in claim 1 wherein step (a) comprises determining a plurality of different frequency bands for feedback recognition, and repeating steps (b), (c) and (d) for each of said different frequency bands.

3. A method as claimed in claim 1 comprising determining said first signal level dependent on a filtered signal obtained by passing said signal transmitted on said signal transmission path through a bandpass filter tuned to said frequency band.

4. A method as claimed in claim 1 comprising determining said second signal level dependent on a filtered signal obtained by passing said attenuated signal through a bandpass filter tuned to said frequency band.

5. A method as claimed in claim 1 comprising determining said first signal level dependent on a first filtered signal obtained by passing said signal, transmitted on said signal transmission path through a bandpass filter tuned to said frequency band, and determining said second signal level dependent on a second filtered signal obtained by passing said attenuated signal through said bandpass filter.

6. A method as claimed in claim 1 comprising obtaining said attenuated signal by connecting a band stop filter tuned to said frequency band into said signal transmission path and thereby attenuating said signal in said frequency band transmitted on said signal transmission path.

7. A method as claimed in claim 1 wherein step (d) comprises recognizing feedback when a difference between said first signal level and said second signal level exceeds a predetermined threshold.

8. A method as claimed in claim 1 comprising determining said frequency band for feedback recognition dependent on an analysis of said signal transmitted on said signal transmission path.

9. A hearing aid comprising:

a microphone and an audio transducer with a signal transmission path therebetween;

a band stop filter selectively connectable into said signal transmission path; and a control unit for selectively connecting said band stop filter into said signal transmission path for determining a first signal level of a signal transmitted on said signal transmission path without said band stop filter connected in said signal transmission path and for determining a second signal level of said signal transmitted on said signal transmission path with said band stop filter connected in said signal transmission path, and for recognizing feedback dependent on a relationship between said first signal level and said second signal level.

10. A hearing aid as claimed in claim 9 wherein said control unit selects a frequency band for determining feedback within the selected frequency band and tunes said band stop filter to said selected frequency band.

11. A hearing aid as claimed in claim 10 further comprising a bandpass filter through which said signal transmitted on said signal transmission path without said band stop filter connected in said signal transmission path passes to obtain a first filtered signal, and through which said signal transmitted on said signal transmission path with said band stop filter connected in said signal transmission path passes to obtain a second filtered signal, and wherein said control unit determines said first signal level dependent on said first filtered signal and determines said second signal level dependent on said second filtered signal.

12. A hearing aid as claimed in claim 9 further comprising an amplifier having a variable gain controlled by said control unit, and wherein said control unit varies said gain of said amplifier upon recognizing feedback to suppress said feedback.

* * * * *